Patented Sept. 20, 1932

1,877,948

UNITED STATES PATENT OFFICE

HEINRICH NERESHEIMER AND WILHELM SCHNEIDER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE N-DIHYDRO 1.2.2'.1'.-ANTHRAQUINONEAZINE SERIES AND PROCESS OF MAKING SAME

No Drawing. Application filed July 19, 1930, Serial No. 469,282, and in Germany July 25, 1929.

The present invention relates to halogen derivatives of products resulting from oxidation of condensation products of N-dihydro-1.2.2'.1'-anthraquinoneazines with formaldehyde, and a process of producing same.

It has already been proposed to convert by oxidation condensation products of N-dihydro-1.2.2'.1'anthraquinoneazines with formaldehyde or agents supplying formaldehyde into vat dyestuffs which are more readily soluble in concentrated sulphuric acid with an olive to olive green coloration and dye substantially more greenish shades than the initial material, the shades assuming a still more greenish tinge when treated with a dilute solution of a hypochlorite. The oxidation may be carried out in acid or alkaline media.

We have now found that these dyestuffs obtained by oxidation are converted into new vat dyestuffs containing halogen by treatment with halogen or with agents supplying halogen in the absence or presence of solvents or suspending agents as for example organic liquids, sulphuric acid and the like, and if desired in the presence of halogenating catalysts. In some cases the preparation of the initial materials and the further working up of the same according to the present invention may be carried out in one operation.

The new dyestuffs differ from the initial materials generally speaking by their substantially better fastness to chlorine and partly by different shades of colour. Moreover, the new dyestuffs no longer change in color when treated with oxidizing agents, for example manganese dioxide, in sulphuric acid solution as do the products obtained by halogenation of the condensation products of N-dihydro-1.2.2'.1'-anthraquinoneazine and formaldehyde which have not been subjected to an oxidizing treatment prior to halogenation. The dyestuffs may be purified if desired, for example by precipitating them from solutions in concentrated sulphuric acid by the addition of a limited amount of water.

The following examples will further illustrate the nature of this invention, but the invention is not restricted to these examples. The parts are by weight.

Example 1

5 parts of paraformaldehyde are introduced at from 5° to 10° C. while stirring into a solution of 10 parts of N-dihydro-1.2.2'.1'-anthraquinoneazine in 100 parts of 96 per cent sulphuric acid and the whole is stirred for several hours at the same temperature, and then for several hours at from 20° C. to 25° C. It is then poured into a solution of 16 parts of potassium bichromate in 2000 parts of water and slowly warmed to about 100° C. After working up, the new dyestuff, which dissolves in concentrated sulphuric acid to give an olive green solution is obtained in the form of a greenish blue paste dyeing cotton fast very greenish blue shades from a blue vat which assumes a still more greenish tinge when treated with a solution of a hypochlorite.

10 parts of the dyestuff thus obtained are suspended in 200 parts of nitrobenzene, 24 parts of sulphuryl chloride are added to the suspension at 90° C. and the mixture is stirred for several hours at this temperature. After cooling the dyestuff which separates is filtered off by suction, washed with a little benzene and converted in the usual manner into the form of paste. It gives dyeings on cotton from a greenish blue vat having a more reddish tinge than those of the initial material but differing therefrom by a substantially better fastness to chlorine.

Example 2

10 parts of N-dihydro-1.2.2'.1'-anthraquinoneazine are dissolved while stirring in 100 parts of a 96 per cent sulphuric acid, 3 parts of paraformaldehyde then being introduced at from 5° to 10° C. into the solution. After several hours the solution is poured into water. The working up is carried out in the usual manner.

5 parts of a 90 per cent manganese dioxide mineral are added at 25° C. to a solution of 3 parts of the dyestuff thus obtained in 60 parts of a 96 per cent sulphuric acid; stirring is continued at 25° C. until practically the whole manganese dioxide is used up, and the reaction mass is then poured into water.

8 parts of sulphuryl chloride are added at 90° C. to a suspension in 200 parts of nitrobenzene of 10 parts of the dyestuff prepared as aforedescribed and purified by adding a limited amount of water to its solution in concentrated sulphuric acid, and the reaction mixture is then stirred for about 2 to 3 hours at from 90° to 95° C. The further working up is carried out as described in Example 1. The new dyestuff dyes cotton from a greenish blue vat shades which are less green but substantially more fast to chlorine than the initial material.

By employing an appreciably larger amount of sulphuryl chloride than is specified in this example, as for example 24 parts, a dyestuff is obtained which gives considerably more reddish dyeings. These dyeings have an equally good fastness to chlorine.

*Example 3*

A weak stream of chlorine is passed for several hours at from 90° to 95° C. through a suspension of 10 parts of the initial material employed in Example 2 in 200 parts of trichlorobenzene. After cooling, the new dyestuff is worked up as described in the second paragraph of Example 1. It dyes cotton from a greenish blue vat somewhat less greenish blue shades than the initial material. The dyeings have a much better fastness to chlorine than the initial material.

The reaction may also be carried out in the presence of agents for binding acids, and catalysts. Thus for example a dyestuff having similar properties to that described in the first paragraph of this example is obtained when, in addition, 10 parts of anhydrous finely powdered sodium acetate and 0.3 part of iodine are added to the reaction mixture.

*Example 4*

10 parts of the initial material employed in Example 2 are suspended in 330 parts of nitrobenzene. After the addition of 10 parts of bromide the suspension is heated for about 3 hours at 150° C. After cooling, the new dyestuff is worked up in the usual manner. It dyes cotton from a green blue vat shades which are very similar to those obtained with the initial material but which differ by being substantially more fast to chlorine.

*Example 5*

By employing only 5 parts of bromide instead of the 10 parts specified in Example 4 and by also adding 0.5 part of iodine to the reaction mixture a dyestuff is obtained which is very similar in its properties to the dyestuff described in Example 4.

*Example 6*

10 parts of the initial material employed in Example 2 are dissolved in 100 parts of sulphuric acid of 66° Baumé, whereupon the solution is warmed to 50° C. after the addition of 11 parts of water and 22 parts of a concentrated sulphuric acid containing 246.6 grams of $N_2O_3$ in each litre. A slow current of chlorine is then passed into the solution at the said temperature for several hours. On pouring the reaction mixture into water the new dyestuff separates out in green blue flakes, probably partly in the form of its azine. The azine may, if desired, be converted into the dihydroazine by the action of mild reducing agents, such as for example sodium bisulphite. The dyestuff dyes cotton from a blue vat greenish blue shades of good fastness against chlorine.

What we claim is:—

1. A process of producing vat dyestuffs of the anthraquinoneazine series, which comprises treating with a halogenating agent the products obtainable by oxidation of the condensation products of N-dihydro-1.2.2'.1'-anthraquinoneazine and formaldehyde.

2. A process of producing vat dyestuffs of the anthraquinoneazine series, which comprises treating in trichlorobenzene with chlorine the products obtainable by oxidation of the condensation products of N-dihydro-1.2.2'.1'-anthraquinoneazine and formaldehyde.

3. As new articles of manufacture halogen derivatives of oxidized condensation products of N-dihydro-1.2.2'.1'-anthraquinoneazine and formaldehyde, the products dyeing cotton from blue to green blue vats blue shades which are substantially faster to chlorine than those obtained with the said unoxidized and oxidized initial material, and being not liable to change in color on treatment with manganese dioxide in sulphuric acid.

4. As new articles of manufacture the chloro derivatives of oxidized condensation products of N-dihydro-1.2.2'.1'-anthraquinoneazine and formaldehyde, the products dyeing cotton from blue to green blue vats blue shades which are substantially faster to chlorine than those obtained with the said unoxidized and oxidized initial material, and being not liable to change in color on treatment with manganese dioxide in sulphuric acid.

5. As a new article of manufacture the chloro derivative of the oxidized condensation product of N-dihydro-1.2.2'.1'-anthraquinoneazine and formaldehyde, obtainable by treating the said oxidized product in trichlorobenzene with chlorine, dyeing cotton from a greenish blue vat somewhat less greenish blue shades than the unchlorinated initial material, but of a substantial better fastness against chlorine, the said chloro derivative being not liable to change in color on treatment with manganese dioxide in sulphuric acid.

In testimony whereof we have hereunto set our hands.

HEINRICH NERESHEIMER.
WILHELM SCHNEIDER.